Feb. 25, 1958     A. R. TROGDEN     2,824,509
AUTOMATIC ELECTRIC DRIP COFFEE MAKER
Filed Aug. 28, 1956
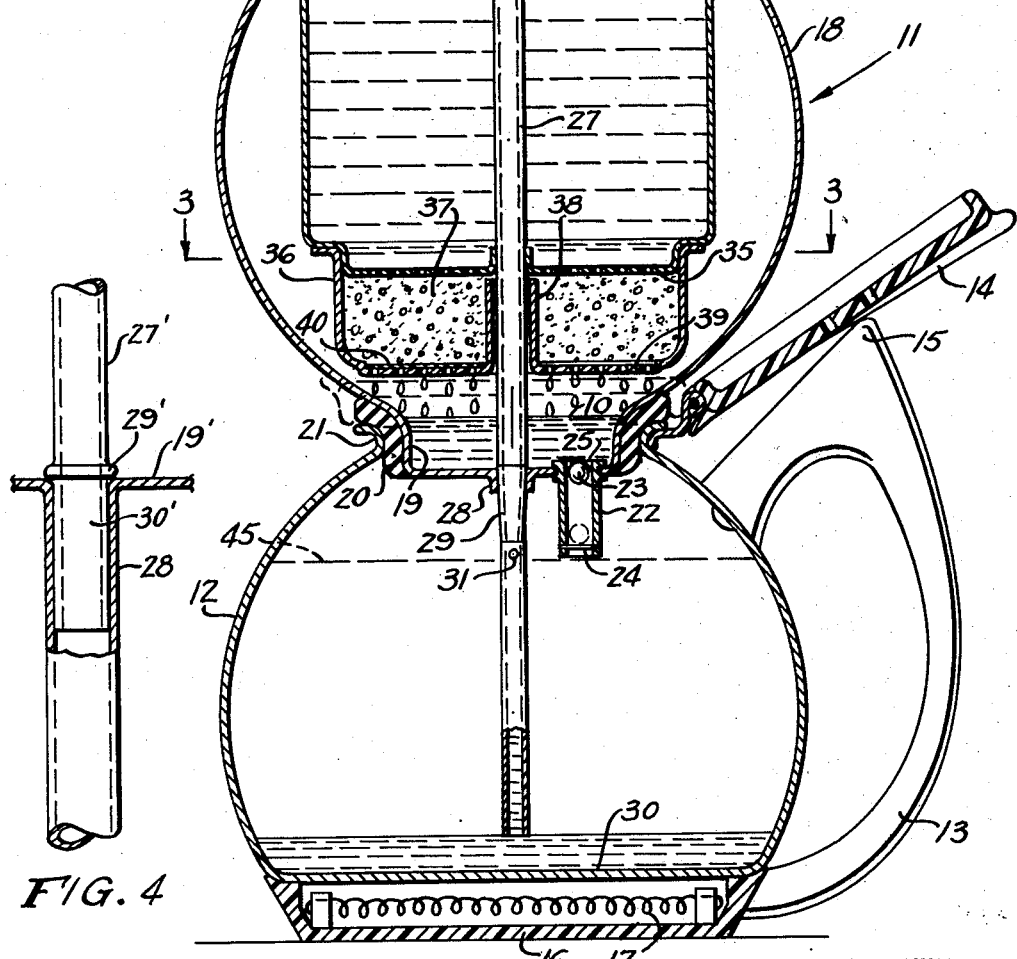
INVENTOR.
ARTHUR R. TROGDEN
BY
McMorrow, Berman & Davidson
ATTORNEYS

United States Patent Office 2,824,509
Patented Feb. 25, 1958

2,824,509

AUTOMATIC ELECTRIC DRIP COFFEE MAKER

Arthur R. Trogden, La Grange, Calif.

Application August 28, 1956, Serial No. 606,614

3 Claims. (Cl. 99—292)

This invention relates to coffee makers, and more particularly to a coffee brewing apparatus of the type provided with its own heating element.

A main object of the invention is to provide a novel and improved coffee brewing apparatus which is simple in construction, which automatically regulates the exposure of the hot water to the coffee grounds so that the water is kept at a relatively high temperature for the full period during which it drips through the coffee grounds, and which provides coffee of improved flavor as well as economical utilization of coffee.

A further object of the invention is to provide an improved automatic electrical coffee making apparatus which is inexpensive to manufacture, which is easy to clean, and which involves a minimum number of parts.

Further objects and advantages of the invention will become apparent from the following description and claims, and from the accompanying drawing, wherein:

Figure 1 is a vertical cross sectional view taken through an improved automatic coffee maker constructed in accordance with the present invention.

Figure 2 is a top view of the water receptacle in the upper container of the coffee maker of Figure 1, said view being taken on line 2—2 of Figure 1 and being to a somewhat reduced scale.

Figure 3 is a horizontal cross sectional view, to a reduced scale, taken on line 3—3 of Figure 1.

Figure 4 is an enlarged fragmentary elevational view, partly in vertical cross section, of a modification of the transfer tube connection which may be employed in conjunction with a coffee making apparatus according to the present invention.

Referring to the drawings, and more particularly to Figures 1, 2 and 3, the coffee brewing apparatus is designated generally at 11 and comprises a bottom container 12 having a handle 13 and a hinged top cover 14 which may be rotated to the open position thereof shown in Figure 1, wherein said cover 14 rests against the top corner element 15 of handle 13, allowing the remainder of the coffee brewing apparatus to be engaged with the lower container 12.

Secured to the bottom of the container 12 is a housing 16 of suitable heat-resistant material containing an electrical heating unit 17 which is connected through conventional thermostatic means, not shown, to a line cord, whereby the heating coil 17 may be energized by plugging the line cord into a domestic outlet receptacle.

Designated at 18 is an upper container which is relatively enlarged in diameter at its intermediate portion and is provided with a depending, generally cylindrical bottom portion 19 provided with an annular collar element 20 of suitable resilient deformable material, whereby the lower portion 19 of upper container 18 may be sealingly engaged in the top rim 21 of the lower container 12. As will be readily understood, the deformable sealing collar 20 engages in the rim 21 with sufficient friction to hold the upper container 18 rigidly above the lower container 12 in the position thereof shown in Figure 1. However, the sealing collar 20 is sufficiently yieldable so that the upper container may be readily disengaged from the lower container 12 whenever required.

The bottom wall of the depending cylindrical portion 19 is provided with a depending check valve 22, comprising a cylindrical conduit secured to, communicating with and depending from the bottom wall of the cylindrical portion 19, said conduit containing a ball valve 23 which engages by gravity of a transverse supporting pin 24 secured in the lower end of the conduit. The top end of the conduit is formed with an annular valve seat 25 against which the ball 23 sealing engages when pressure is exerted on the ball from beneath, for example, when steam is formed in the bottom container 12, whereby the check valve 23 seals off the bottom container from the upper container 18 responsive to the development of steam pressure in the lower container 12. As will be readily understood, when there is insufficient steam pressure in the lower container 12 to elevate the ball 23, the ball descends, allowing any liquid in the cylindrical bottom portion of the upper container 18 to pass freely downwardly into the lower container 12.

Designated at 26 is a water receptacle which extends through and fits within the relatively large top opening of the upper container 18 and has centrally secured therein a vertical transfer tube 27 which extends downwardly and is sealingly and slidably received in a depending central annular downwardly tapering sleeve element 28 formed in the bottom of the cylindrical portion 19 of the upper container 18.

The lower portion of the transfer tube 27 is formed with a downwardly tapered section 29 which is sealingly engageable in the tapered sleeve 28 to limit the downward movement of the transfer tube 27 to the position thereof shown in Figure 1, wherein the water receptacle 26 is supported with its major portion received in the upper container 18.

As shown in Figure 1, the transfer tube 27 depends a substantial distance downwardly in the lower container 12, terminating in the lower portion of said lower container adjacent the bottom wall 30 thereof. The transfer tube is formed with a vent opening 31 spaced below the collar 29, said vent opening allowing air to be discharged from the lower container 12 as the temperature of the water therein increases and as the water is changed to steam. The opening 31 also facilitates the free passage of beverage from the upper container 18 to the lower container 12 by consistently relieving any pressure built up in the lower container because of the entry of the brew into the lower container from the upper container during the brewing process, as will be presently described.

The transfer tube 27 is provided at its top end with the laterally extending conduit arms 33, 33 which terminate in downwardly directed spout portions 34, 34, as shown in Figure 1. The water receptacle 26 is formed at its bottom end with a perforated, downwardly dished portion 35, on which is engaged the annular receptacle 36 which contains the coffee grounds 37. The receptacle 36 is formed with an axial central sleeve 38 through which the transfer tube 27 extends, and shown. The grounds receptacle 36 is provided with a perforated bottom wall 39. A filter element 40, of filter paper or the like, is normally disposed on the perforated bottom wall 39 in the grounds receptacle 36, to allow brew to trickle slowly through the apertures of the bottom wall 39 of the grounds container into the depending bottom portion 19 of the upper receptacle 18.

The water receptacle 26 is provided with the top cover 42 having apertures 43, whereby the space inside the water receptacle 26 is freely exposed to atmosphere. The top cover 42 is provided with a handled knob 44 of suitable heat insulating material.

In preparing coffee, the coffee grounds are placed in the receptacle 36, and the receptacle is engaged on the downwardly dished apertured bottom portion 35 of the water receptacle 26. The bottom container 12 filled with water up to a suitable level, such as the level line 45, shown in dotted view in Figure 1, which is spaced just below the bottom end of the conduit of check valve 22. The upper container 18 is then placed on the lower container 12, and the water container 26 is then placed in the upper container 18 by engaging the transfer tube 27 through the sleeve 28 and allowing the upper container 26 to assume a position in receptacle 18 wherein the transfer tube collar 29 engages on the top rim of sleeve 28, as shown in Figure 1. The heating coil 17 is then energized, allowing the water in the lower receptacle 12 to become heated. The check valve 22 remains open by gravity until the water has boiled for a few seconds, but as soon as the vapor tension increases sufficiently to force the valve ball 23 against the valve seat 25, the steam pressure builds up in the lower receptacle 12 sufficiently to force the water upwardly through the transfer tube 27, whereby the hot water fills the water receptacle 26. The hot water then drips through the coffee grounds 37 and through the filter paper 40, passing through the apertured wall 39 of the grounds container 36 into the depending cylindrical bottom portion 19 of the upper receptacle 18. After the water in the lower receptacle 12 has been transferred to the water container 26, the thermostat switch associated with the heating coil 17 switches the heater winding 17 to low heat, whereby the steam pressure in the lower container 12 drops sufficiently to allow the valve ball 23 to descend. The descent of the valve ball opens check valve 22, allowing the brew accumulated in the lower portion 19 of the upper container 18 to flow into the lower container 12. As the brew accumulates in the lower container 12, it is kept hot by the heater winding 17, which is maintained at low heat by its thermostatic control switch.

It will be noted that the hot water in the water container 26 is maintained at a relatively high temperature, of the order of two-hundred and ten degrees Fahrenheit, for the full drip, because the upper container 18 acts as a steam chest.

It will be noted that the transfer tube 27 acts as a vent for the steam pressure developed in the lower receptacle 12 after all the water in the lower receptacle has been forced into the water receptacle 26. This occurs because the transfer tube 27 communicates with the upper portion of the water receptacle 26, which is exposed to atmosphere through the opening 43 in its cover 42. Thus, as soon as all the water has been forced from the lower receptacle 12 into the water receptacle 26, the pressure in the lower receptacle is relieved, allowing the check valve ball 23 to open, and thereby allowing the brew in the lower portion 19 of the upper receptacle 18 to flow into the lower receptacle 12.

Figure 4 illustrates an alternative method of connecting the transfer tube to the bottom of the upper receptacle 18. In the modification illustrated in Figure 4, the bottom wall of the upper receptacle 18 is designated at 19' and is centrally formed with a depending sleeve 28' of a length sufficient to reach almost to the bottom of the lower receptacle 12. The transfer tube, shown at 27', is secured to the water receptacle, as in the previously described form of the invention, and is provided with a supporting collar element 29' spaced a short distance above the lower end of the tube 27', whereby a relatively short length 30' of the transfer tube is engageable in the sleeve 28'. As will be readily understood, the portion 30' of transfer tube 27' slidably and sealingly engages in the sleeve 28', whereby said sleeve 28' defines a continuation of the transfer tube, providing the same result as is obtained in the structural arrangement illustrated in Figures 1 to 3.

While certain specific embodiments of an improved coffee brewing apparatus has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A coffee brewing apparatus comprising a bottom container, heating means in said bottom container, an upper container sealingly engaged in the top of said bottom container, said upper container being relatively enlarged at its intermediate portion and having an imperforate bottom and a relatively large top opening, a water receptacle in said upper container extending upwardly through and fitting within said top opening, whereby a steam chest is defined around the receptacle in said upper container, said receptacle having a perforated bottom, a perforated coffee grounds receptacle engaged on the water receptacle beneath said perforated bottom, a check valve in the bottom of said upper container beneath the grounds receptacle, and a vertical conduit extending centrally through the water receptacle, the grounds receptacle and the bottom wall of the upper container into the bottom container and extending adjacent the lower portion of said bottom container.

2. A coffee brewing apparatus comprising a bottom container, heating means in said bottom container, an upper container sealingly engaged in the top of said bottom container, said upper container being relatively enlarged at its intermediate portion and having an imperforate bottom and a relatively large top opening, a water receptacle in said upper container extending upwardly through and fitting within said top opening, whereby a steam chest is defined around the receptacle in said upper container, said receptacle having a perforated bottom, a perforated coffee grounds receptacle engaged on the water receptacle benath said perforated bottom, a check valve in the bottom of said upper container beneath the grounds receptacle, a vertical conduit secured to the perforated bottom of said water receptacle and extending centrally through the water receptacle, the grounds receptacle and the bottom wall of the upper container into the bottom container and extending substantially adjacent to the bottom of said bottom container, and a laterally extending conduit arm on the top end of said vertical conduit.

3. A coffee brewing apparatus comprising a bottom container, an electrical heating element in the bottom portion of said bottom container, an upper container sealingly engaged in the top of said bottom container, said upper container being relatively enlarged at its intermediate portion and having an imperforate bottom and a relatively large top opening, a water receptacle in said upper container extending upwardly through and fitting within said top opening, whereby a steam chest is defined around the receptacle in said upper container, said receptacle having a perforated bottom, perforated coffee grounds receptacle engaged on the water receptacle beneath said perforated bottom, a downwardly opening check valve in the bottom of said upper container beneath the grounds receptacle formed and arranged to at times allow liquid to flow downwardly from the upper container into the lower container but at other times to prevent steam from passing upwardly therethrough, a vertical conduit secured to the perforated bottom of said water receptacle and extending centrally through the water receptacle, the grounds receptacle and the bottom wall of the upper container into the bottom container and extending adjacent the lower wall of said bottom container, and a laterally extending conduit arm on the top end of said vertical conduit.

References Cited in the file of this patent

UNITED STATES PATENTS 2,513,594     Snyder                July 4, 1950